United States Patent
Willi (10) Patent No.: US 9,702,328 B2
(45) Date of Patent: Jul. 11, 2017

(54) FUEL COMBUSTION SYSTEM HAVING COMPONENT WITH KNURLED CONDUCTION SURFACE AND METHOD OF MAKING SAME

(71) Applicant: Caterpillar Inc., Peoria, IL (US)

(72) Inventor: Martin Willi, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 166 days.

(21) Appl. No.: 14/702,106

(22) Filed: May 1, 2015

(65) Prior Publication Data

US 2016/0319791 A1 Nov. 3, 2016

(51) Int. Cl.

| F02M 61/18 | (2006.01) |
|---|---|
| F02M 61/16 | (2006.01) |
| F02M 53/04 | (2006.01) |
| F02M 57/06 | (2006.01) |
| F02F 1/36 | (2006.01) |
| F02B 19/12 | (2006.01) |

(52) U.S. Cl.
CPC ........... *F02M 61/168* (2013.01); *F02B 19/12* (2013.01); *F02F 1/36* (2013.01); *F02M 53/043* (2013.01); *F02M 57/06* (2013.01); *F02M 61/166* (2013.01); *F02M 61/18* (2013.01); *F02M 2200/80* (2013.01)

(58) Field of Classification Search
CPC .... F02M 61/168; F02M 61/18; F02M 53/043; F02B 19/1009; F02B 19/16
USPC ......................................... 123/445, 254, 286
See application file for complete search history.

(56) References Cited

U.S. PATENT DOCUMENTS

| 2,560,799 | A |   | 8/1946 | Johnson |
|---|---|---|---|---|
| 2,972,987 | A | * | 2/1961 | Steidler ................. F02B 19/14 |
|   |   |   |   | 123/275 |
| 4,416,228 | A |   | 11/1983 | Benedikt et al. |
| 4,509,476 | A | * | 4/1985 | Breuser ................. F02B 19/12 |
|   |   |   |   | 123/256 |
| 4,669,433 | A | * | 6/1987 | Hoppie ................. F02M 31/16 |
|   |   |   |   | 123/276 |
| 5,085,189 | A |   | 2/1992 | Huang et al. |
| 5,580,476 | A |   | 12/1996 | Dam et al. |

(Continued)

FOREIGN PATENT DOCUMENTS

| DE | 1751606 | 8/1971 |
|---|---|---|
| DE | 3112619 | 6/1982 |

*Primary Examiner* — Mahmoud Gimie
(74) *Attorney, Agent, or Firm* — Leydig, Voit & Mayer, Ltd.

(57) ABSTRACT

A component of a fuel combustion system of an engine includes a body with a knurled conduction surface. The body is hollow and defines a central longitudinal axis. The body includes an outer surface, an inner surface, and an orifice surface. The outer surface defines an outer opening. The inner surface defines an interior chamber and an inner opening. The orifice surface defines an orifice passage extending between, and in communication with, the outer opening and the inner opening. The orifice passage is in communication with the interior chamber via the inner opening. The outer surface includes the knurled conduction surface. The knurled conduction surface has a boundary surface and a plurality of protrusions that project outwardly from the boundary surface. At least a portion of the knurled conduction surface is axially aligned with the interior chamber along the central longitudinal axis.

20 Claims, 4 Drawing Sheets

(56) References Cited

U.S. PATENT DOCUMENTS

| | | |
|---|---|---|
| 5,593,607 A | 1/1997 | Dam et al. |
| 5,601,061 A | 2/1997 | Dam et al. |
| 5,771,857 A | 6/1998 | Willi |
| 5,809,957 A | 9/1998 | Antone et al. |
| 5,868,121 A | 2/1999 | Brown et al. |
| 5,870,978 A | 2/1999 | Willi et al. |
| 5,947,076 A | 9/1999 | Srinivasan et al. |
| 5,975,050 A | 11/1999 | Brown et al. |
| 6,000,384 A | 12/1999 | Brown et al. |
| 6,009,860 A | 1/2000 | Brown et al. |
| 6,032,617 A | 3/2000 | Willi et al. |
| 6,044,806 A | 4/2000 | Brown et al. |
| 6,055,963 A | 5/2000 | Brown et al. |
| 6,095,102 A | 8/2000 | Willi et al. |
| 6,101,986 A | 8/2000 | Brown et al. |
| 6,158,418 A | 12/2000 | Brown et al. |
| 6,289,871 B1 | 9/2001 | Brown et al. |
| 6,386,149 B1 | 5/2002 | Coleman et al. |
| 6,575,192 B1 | 6/2003 | Shaffer |
| 6,666,185 B1 | 12/2003 | Willi et al. |
| 6,739,289 B2 | 5/2004 | Hiltner et al. |
| 7,007,669 B1 | 3/2006 | Willi et al. |
| 7,261,097 B2 | 8/2007 | Gong et al. |
| 7,343,905 B2 | 3/2008 | Willi et al. |
| 7,467,621 B2 | 12/2008 | Lauper, Jr. et al. |
| 7,654,086 B2 | 2/2010 | Gong et al. |
| 7,849,692 B2 | 12/2010 | Baldwin et al. |
| 7,905,206 B2 | 3/2011 | Willi et al. |
| 8,028,679 B2 | 10/2011 | Willi et al. |
| 8,113,173 B2 | 2/2012 | Willi et al. |
| 8,150,603 B2 | 4/2012 | Willi et al. |
| 8,783,229 B2 | 7/2014 | Kim et al. |
| 8,899,040 B2 | 12/2014 | Vijayaraghavan et al. |
| 2003/0200939 A1 | 10/2003 | Hiltner et al. |
| 2003/0221661 A1 | 12/2003 | Willi et al. |
| 2007/0000248 A1 | 1/2007 | Gong et al. |
| 2007/0000472 A1 | 1/2007 | Gong et al. |
| 2007/0234715 A1 | 10/2007 | Willi et al. |
| 2008/0022684 A1 | 1/2008 | Baldwin et al. |
| 2008/0098995 A1 | 5/2008 | Lauper et al. |
| 2008/0295501 A1 | 12/2008 | Gong et al. |
| 2009/0320814 A1 | 12/2009 | Fiveland et al. |
| 2010/0019506 A1 | 1/2010 | Gong et al. |
| 2010/0126463 A1 | 5/2010 | Willi et al. |
| 2010/0126465 A1 | 5/2010 | Willi et al. |
| 2010/0126481 A1 | 5/2010 | Willi et al. |
| 2010/0131172 A1 | 5/2010 | Willi et al. |
| 2010/0131173 A1 | 5/2010 | Willi et al. |
| 2011/0297128 A1 | 12/2011 | Kim et al. |
| 2012/0210988 A1 | 8/2012 | Willi |
| 2012/0227397 A1 | 9/2012 | Willi et al. |
| 2013/0081391 A1 | 4/2013 | Vijayaraghavan et al. |
| 2014/0026847 A1 | 1/2014 | Willi et al. |
| 2014/0032080 A1 | 1/2014 | Gehrke et al. |
| 2014/0032081 A1 | 1/2014 | Willi et al. |
| 2014/0060946 A1 | 3/2014 | Willi |
| 2014/0158088 A1 | 6/2014 | Gehrke et al. |
| 2014/0196686 A1 | 7/2014 | Coldren et al. |

* cited by examiner

FUEL COMBUSTION SYSTEM HAVING COMPONENT WITH KNURLED CONDUCTION SURFACE AND METHOD OF MAKING SAME

TECHNICAL FIELD

This patent disclosure relates generally to a fuel combustion system for an internal combustion engine and, more particularly, to a component of a fuel combustion system for an internal combustion engine.

BACKGROUND

One type of internal combustion engines typically employs cylinders which compress a fuel and air mixture such that, upon firing of a spark plug associated with each cylinder, the compressed mixture ignites. The expanding combustion gases resulting therefrom move a piston within the cylinder. Upon reaching an end of its travel in one direction within the cylinder, the piston reverses direction to compress another volume of the fuel and air mixture. The resulting mechanical kinetic energy can be converted for use in a variety of applications, such as, propelling a vehicle or generating electricity, for example.

Another type of internal combustion engine, known as a compression ignition engine, uses a highly-compressed gas (e.g., air) to ignite a spray of fuel released into a cylinder during a compression stroke. In such an engine, the air is compressed to such a level as to achieve auto-ignition of the fuel upon contact between the air and fuel. The chemical properties of diesel fuel are particularly well suited to such auto-ignition.

The concept of auto-ignition is not limited to diesel engines, however, and has been employed in other types of internal combustion engines as well. For example, a self-igniting reciprocating internal combustion engine can be configured to compress fuel in a main combustion chamber via a reciprocating piston. In order to facilitate starting, each main combustion chamber is associated with a prechamber, particularly useful in starting cold temperature engines. Fuel is injected into not only the main combustion chamber, but also the combustion chamber of the prechamber, as well, such that, upon compression by the piston, a fuel and air mixture is compressed in both chambers. A glow plug or other type of heater is disposed within the prechamber to elevate the temperature therein sufficiently to ignite the compressed mixture. The combustion gases resulting from the ignition in the prechamber are then communicated to the main combustion chamber.

Other types of internal combustion engines use natural gas as the fuel source and include at least one piston reciprocating within a respective cylinder. A spark plug is positioned within a cylinder head associated with each cylinder and is fired on a timing circuit such that upon the piston reaching the end of its compression stroke, the spark plug is fired to thereby ignite the compressed mixture.

In still further types of internal combustion engines, prechambers are employed in conjunction with natural gas engines. Given the extremely high temperatures required for auto-ignition with natural gas and air mixtures, glow plugs or other heat sources such as those employed in typical diesel engines can be ineffective. Rather, a prechamber is associated with each cylinder of the natural gas engine and is provided with a spark plug to initiate combustion within the prechamber which can then be communicated to the main combustion chamber. Such a spark-ignited, natural gas engine prechamber is provided in, for example, the 3600 series natural gas engines commercially available from Caterpillar Inc. of Peoria, Ill.

The components of internal combustion engines can be subjected to very high temperatures. For example, the surfaces defining the orifices of the nozzle of a member of a fuel combustion system, such as a prechamber nozzle, for example, can be subjected to very high temperatures as a result of the flow and temperature characteristics of the fuel mixtures traveling therethrough. In the case of a prechamber assembly, the high temperatures can be caused by the velocity of the fuel/air mixture entering the nozzle through the orifices and the ignition flame front discharged from the nozzle out through the orifices. As a result, the high temperatures to which the orifices are subjected can cause degradation of the nozzle and impair the function of the nozzle over time.

German Patent Reference DE3112619 is entitled, "Ribbed Precombustion Chamber Insert for Diesel Engines." The '619 patent is directed to a precombustion chamber device for a diesel engine which includes a pre-combustion chamber insert and at least one outer spacing rib for thermal isolation of the precombustion chamber insert from the diesel engine. The spacing rib can be formed in the vessel which accommodates the precombustion chamber insert. According to the preferred embodiment, however, the spacing rib is formed on the precombustion chamber insert itself along its outside wall.

There is a continued need in the art to provide additional solutions to enhance the performance of a component of a fuel combustion system. For example, there is a continued need to enable a component of a fuel combustion system to operate so as to enhance the combustion of fuel within the system while managing the heat generated during use of the fuel combustion system to improve the durability and useful life of the component.

It will be appreciated that this background description has been created by the inventors to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

SUMMARY

In an embodiment, the present disclosure describes a fuel combustion component of a fuel combustion system of an engine. The fuel combustion component includes a body with a knurled conduction surface.

The body is hollow and defines a central longitudinal axis. The body includes an outer surface, an inner surface, and an orifice surface. The outer surface defines an outer opening. The inner surface defines an interior chamber and an inner opening. The orifice surface defines an orifice passage extending between, and in communication with, the outer opening and the inner opening. The orifice passage is in communication with the interior chamber via the inner opening.

The outer surface includes the knurled conduction surface. The knurled conduction surface has a boundary surface and a plurality of protrusions. The plurality of protrusions projects outwardly from the boundary surface. At least a portion of the knurled conduction surface is axially aligned with the interior chamber along the central longitudinal axis.

In yet another embodiment, a fuel combustion system includes a cylinder block, a cylinder head, and a fuel combustion component. The cylinder block defines, at least partially, a main combustion chamber. The cylinder head is removably attached to the cylinder block. At least one of the cylinder block and the cylinder head includes a passage surface defining a component passage.

The fuel combustion component extends through the component passage such that the fuel combustion component is in communication with the main combustion chamber. The fuel combustion component includes a body with a knurled conduction surface.

The body is hollow and includes an outer surface, an inner surface, and an orifice surface. The outer surface defines an outer opening, and the inner surface defines an interior chamber and an inner opening. The orifice surface defines an orifice passage extending between, and in communication with, the outer opening and the inner opening. The orifice passage is in communication with the interior chamber via the inner opening and the main combustion chamber via the outer opening.

The outer surface includes the knurled conduction surface. The knurled conduction surface has a boundary surface and a plurality of protrusions. The plurality of protrusions projects outwardly from the boundary surface. At least a portion of the knurled conduction surface is aligned with the passage surface. The knurled conduction surface is configured such that at least a portion of the plurality of protrusions are in contacting relationship with the passage surface when the fuel combustion component is in an operating temperature range such that a thermal conduction path is defined between the knurled conduction surface and the passage surface.

In still another embodiment, a method of making a fuel combustion component of a fuel combustion system of an engine is described. The method of making includes manufacturing a body with a knurled conduction surface. The body is hollow and defines a central longitudinal axis. The body includes an outer surface and an inner surface. The outer surface defines an outer opening, and the inner surface defines an interior chamber and an inner opening.

An orifice surface is defined. The orifice surface defines an orifice passage extending between, and in communication with, the outer opening and the inner opening. The orifice passage is in communication with the interior chamber via the inner opening.

The body is manufactured such that the outer surface includes the knurled conduction surface. The knurled conduction surface has a boundary surface and a plurality of protrusions. The plurality of protrusions projects outwardly from the boundary surface. At least a portion of the knurled conduction surface is axially aligned with the interior chamber along the central longitudinal axis.

Further and alternative aspects and features of the disclosed principles will be appreciated from the following detailed description and the accompanying drawings. As will be appreciated, the principles related to fuel combustion systems, fuel combustion components, and methods of making a fuel combustion component for a fuel combustion system of an engine disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

The present disclosure provides embodiments of a component of a fuel combustion system of an engine. In embodiments, the fuel combustion component, such as a nozzle of a prechamber assembly or a fuel injector, for example, can be mounted to at least one of a cylinder head or cylinder block of an internal combustion engine. Exemplary engines include those used in vehicles, electrical generators, and pumps, for examples.

Embodiments of a fuel combustion component constructed according to principles of the present disclosure can include a body with a knurled conduction surface that helps facilitate the heat transfer between the body and a cooler portion of the fuel combustion system during intended operation of the fuel combustion system, such as, the cylinder head and/or the cylinder block, for example. The knurled conduction surface can help reduce the temperature of the body by facilitating heat transfer along a thermal conduction path defined between the knurled conduction surface of the body and the component with which the knurled conduction surface is in contacting relationship.

The knurled conduction surface can also help accommodate thermal expansion of the fuel combustion component without imposing excessive stress upon the cylinder head/cylinder block that would lead to cracks or other structural impairments. In embodiments, the knurled conduction surface can be configured and the sizes of the knurled conduction surface and passage accommodating the fuel combustion component therethrough are controlled such that the thermal expansion of the fuel combustion component in the cylinder passage when subjected to operating temperatures when the fuel combustion system is operating as intended places the peaks of the protrusions of the knurled conduction surface into contact with the cylinder passage surface, establishing a contacting relationship therebetween without exceeding the allowable stress inside the component passage in which the knurled conduction surface is disposed. This contact relationship increases the conductive heat transfer between the fuel combustion component and the cooler cylinder head/block passage surface, thereby reducing the temperature of the fuel combustion component.

Embodiments of a fuel combustion component constructed according to principles of the present disclosure can be made using additive manufacturing techniques. In embodiments, the knurled conduction surface can comprise protrusions that are made from a different material than that used for the body.

Figure 1:
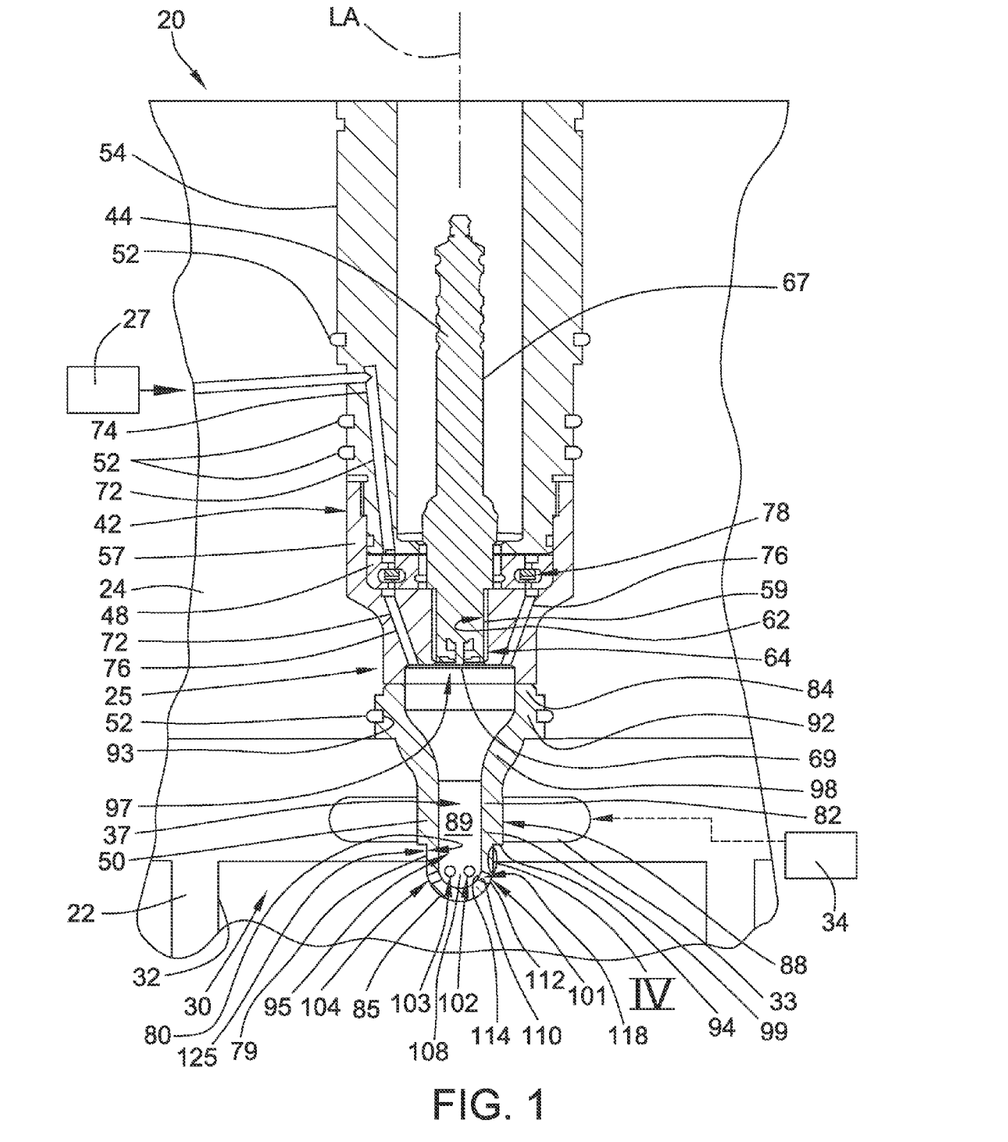
FIG. 1 is a diagrammatic, longitudinal cross-sectional view of an embodiment of a fuel combustion system constructed in accordance with principles of the present disclosure and including an embodiment of a fuel combustion component in the form of a prechamber nozzle constructed in accordance with principles of the present disclosure.

Turning now to the FIGURES, there is shown in FIG. 1 an exemplary embodiment of a fuel combustion system 20 constructed in accordance with principles of the present disclosure. The fuel combustion system 20 can be used in any suitable internal combustion engine, such as an engine configured as part of an electrical generator or a pump, for example. The fuel combustion system 20 can be used with any suitable fuel with an appropriate fuel/air ratio. In embodiments, fuels with different ignition and burning characteristics and different specific fuel to air ratios can be used. The fuel combustion system 20 can include a cylinder block 22, a cylinder head 24, a prechamber assembly 25 having a fuel combustion component in the form of a nozzle 50 constructed in accordance with principles of the present disclosure, a supplemental fuel source 27, and a variety of other combustion devices, as will be appreciated by one skilled in the art.

Referring to FIG. 1, the cylinder block 22 defines, at least partially, a main combustion chamber 30. In embodiments, the cylinder block 22 can define a plurality of cylinders 32 (one of which is shown in FIG. 1) within which is defined the corresponding main combustion chamber 30. In embodiments, a cylinder liner can be disposed within each cylinder 32. The cylinder liner can be removably secured in the cylinder block 22.

The cylinder head 24 can be removably attached to the cylinder block 22 via suitable fasteners, such as a plurality of bolts, as will be appreciated by one skilled in the art. A gasket (not shown) can be interposed between the cylinder block 22 and the cylinder head 24 to seal the interface therebetween. The cylinder head 24 typically has bores machined for engine valves (not shown), e.g., inlet and exhaust valves, and other components of the fuel combustion system 20 (not shown), e.g., fuel injectors, glow plugs, sparks plugs, and combinations thereof, as will be appreciated by one skilled in the art. In other embodiments, the fuel combustion system 20 can include a fuel injector having a nozzle constructed according to principles of the present disclosure.

Each cylinder 32 of the cylinder block 22 can house a reciprocally movable piston (not shown), which is coupled to a crankshaft via a suitable transfer element (e.g., a piston rod or connecting rod). The piston is reciprocally movable within the cylinder 32 for compressing and thereby pressurizing the combustible mixture in the main combustion chamber 30 during a compression phase of the engine. In embodiments, the engine can be configured to have a suitable compression ratio suited for the intended purpose of the engine as will be understood by one skilled in the art.

In embodiments, at least one intake valve mechanism (not shown) and at least one exhaust valve mechanism (not shown) can be operatively positioned within the cylinder head 24 such that the intake valve and the exhaust valve are axially movable in the cylinder head 24. In embodiments, a mechanical valve train (e.g., including a cam, follower, and push rod mechanism) or other hydraulic and/or electric control device can be used in a conventional manner to selectively operate the intake valve mechanism and the exhaust valve mechanism. In particular, the inlet valve mechanism can be opened to admit a predetermined amount of a lean gaseous combustible mixture of fuel and air directly into the main combustion chamber 30 above the piston during an intake phase of the engine. The exhaust valve mechanism can be opened to permit the exhaust of the gases of combustion from the main combustion chamber 30 during an exhaust phase of the engine.

In embodiments, at least one of the cylinder block 22 and the cylinder head 24 define at least one coolant passage 33. Each coolant passage 33 can be adapted to be placed in communication with a coolant fluid source 34 and configured to cool one or more components of the fuel combustion system 20. In embodiments, any suitable cooling system can be placed in fluid communication with the coolant passage 33 to circulate a coolant fluid from the coolant fluid source 34 through the coolant passage 33 in the cylinder block 22 and/or the cylinder head 24. The cylinder block 22 and the cylinder head 24 can be made from any suitable material, such as a suitable, heat-resistant metal, for example.

The prechamber assembly 25 is removably secured in the cylinder head 24 such that the prechamber assembly 25 is in communication with the main combustion chamber 30. The prechamber assembly 25 defines a precombustion chamber 37, which is in communication with the main combustion chamber 30. The prechamber assembly 25 includes a prechamber housing 42, an ignition device 44 adapted to selectively ignite a fuel disposed in the precombustion chamber 37, a control valve 48, and the nozzle 50. The nozzle 50 and the prechamber housing 42 can be made from any suitable material, such as a suitable, heat-resistant metal. Suitable sealing devices 52, such as o-rings, for example, can be disposed between the prechamber assembly 25 and the cylinder head 24. In other embodiments, other sealing techniques, such as, press fit, metal seals, and the like, can be used.

The nozzle 50 and the prechamber housing 42 cooperate together to define the precombustion chamber 37 and to define a central longitudinal axis LA of the prechamber assembly 25. The nozzle 50 and the prechamber housing 42 include surfaces that are generally surfaces of revolution about the central longitudinal axis LA. The precombustion chamber 37 has a predetermined geometric shape and volume. In embodiments, the volume of the precombustion chamber 37 is smaller than the volume of the main combustion chamber 30. In some embodiments, the volume of the precombustion chamber 37 is in a range between about one and about four percent of the total combustion chamber volume at top dead center.

In the illustrated embodiment, the prechamber housing 42 includes an upper member 54 and a lower member 57, which are threadingly secured together. In other embodiments, other types of engagement between the upper member 54 and the lower member 57 can be used, such as, welding, press fitting, and the like. The prechamber housing 42 is hollow and is adapted to receive the ignition device 44 therein.

The ignition device 44 is mounted to the prechamber housing 42. The illustrated lower member 57 of the prechamber housing 42 defines an ignition device bore 59 which has an internal threaded surface 62. The ignition device 44 has an external threaded surface 64 which is threadedly engaged with the internal threaded surface 62 of the ignition device bore 59. The ignition device bore 59 is in communication with the precombustion chamber 37.

In the illustrated embodiment, the ignition device 44 comprises a spark plug 67 with an electrode 69. The spark plug 67 is removably mounted to the prechamber housing 42 such that the electrode 69 is in communication with the precombustion chamber 37. The spark plug 67 is threadedly received in the ignition device bore 59 with the electrode 69 exposed to the precombustion chamber 37 by way of the ignition device bore 59. The spark plug 67 can be adapted to be electrically energized in a conventional manner.

In embodiments, at least one of the prechamber housing 42 and the nozzle 50 define a supplemental fuel passage 72. The supplemental fuel passage 72 is in communication with the precombustion chamber 37 and with the supplemental fuel source 27. In embodiments, the fuel of the supplemental fuel source 27 can have a richer fuel/air ratio than the fuel/air ratio of the fuel supplied directly to the main combustion chamber 30 with which the prechamber assembly 25 is associated.

In the illustrated embodiment of FIG. 1, the upper member 54 and the lower member 57 of the prechamber housing 42 both define the supplemental fuel passage 72. The illustrated upper member 54 defines a fuel passage entry segment 74. The illustrated lower member 57 of the prechamber housing 42 defines a plurality of precombustion chamber fuel passage segments 76 which are circumferentially arranged about the lower member 57 and in fluid communication with the fuel passage entry segment 74 via a control valve cavity 78 defined between the upper member 54 and the lower member 57.

The control valve 48 is disposed within the prechamber housing 42 and is adapted to selectively occlude the supplemental fuel passage 72 to prevent a flow of fuel from the supplemental fuel source 27 to the precombustion chamber 37. The illustrated control valve 48 is disposed within the control valve cavity 78 and is interposed between the fuel passage entry segment 74 and the precombustion chamber fuel passage segments 76. The control valve 48 can be adapted to selectively permit the flow of fuel from the supplemental fuel source 27 into the precombustion chamber 37 of the prechamber assembly 25 to further promote ignition within the precombustion chamber 37. The control valve 48 can be adapted to open and close with the engine's combustion cycle to prevent contamination of the fuel with exhaust and/or prevent leakage of fuel into the exhaust gases. The control valve 48 can be adapted to prevent the gas product of combustion to flow from the precombustion chamber 37 to the fuel passage entry segment 74 of the supplemental fuel passage 72 during the compression, combustion, and exhaust phases of the engine.

In embodiments, the control valve 48 can be any suitable control valve, such as a check valve assembly including a free-floating ball check having an open mode position—permitting the flow of the fuel from the supplemental fuel source 27 to the precombustion chamber 37—and a closed mode position—preventing gas flow from the supplemental fuel source 27 to the precombustion chamber 37. In other embodiments, the control valve 48 can be a shuttle type check valve. In the illustrated embodiment, the control valve 48 is similar in construction and function to the check valve shown and described in U.S. Pat. No. 6,575,192.

The embodiment of a fuel combustion component constructed in accordance with principles of the present disclosure illustrated in FIG. 1 is in the form of the nozzle 50. The nozzle 50 is in communication with the main combustion chamber 30. In embodiments, at least one of the cylinder block and the cylinder head includes a passage surface 79 defining a component passage 80. The fuel combustion component 50 extends through the component passage 80 such that the fuel combustion component 50 is in communication with the main combustion chamber 30.

The nozzle 50 includes a nozzle body 82 having a mounting end 84 and a distal tip 85. The nozzle body 82 defines the central longitudinal axis LA which extends between the mounting end 84 and the distal tip 85. The nozzle body 82 is hollow and includes an outer surface 88 and an inner surface 89. The outer surface 88 and the inner surface 89 are both surfaces of revolution about the central longitudinal axis LA.

The mounting end 84 of the nozzle 50 is in abutting relationship with the lower member 57 of the prechamber housing 42. The mounting end 84 of the nozzle body 82 includes an annular flange 92 that defines an external circumferential groove 93 configured to receive a suitable sealing device 52 (e.g., an o-ring) therein for sealing. Any suitable technique can be used to provide a seal between the nozzle 50 and the lower member 57 of the prechamber housing 42, such as, o-rings, press fit, metal seals, gaskets, welding, and the like.

The nozzle body 82 is positioned adjacent one of the coolant passages 33 such that coolant fluid circulating through the coolant passage 33 is in heat-transferring relationship with the nozzle body 82. The nozzle body 82 projects from the cylinder head 24 such that the distal tip 85 of the nozzle body 82 is disposed in the main combustion chamber 30 so that the distal tip 85 is in communicating relationship with the main combustion chamber 30. Any suitable sealing technique can be used to seal an interface 94 between the nozzle 50 and the cylinder block 22 and/or the cylinder head 24, such as, a gasket, a taper fit, and/or a press fit to isolate fuel, combustion gases, and engine coolant therein.

The inner surface 89 of the nozzle body 82 defines an interior chamber 95 which is open to and in communication with a distal cavity 97 defined in the lower member 57 of the prechamber housing 42. The interior chamber 95 of the nozzle body 82 and the distal cavity 97 of the lower member 57 together define the precombustion chamber 37 of the prechamber assembly 25. The interior chamber 95 of the nozzle body 82 is open to the electrode 69 of the spark plug 67 and is in fluid communication with the supplemental fuel passage 72 via the precombustion chamber fuel passage segments 76 of the lower member 57.

The mounting end 84 of the nozzle body 82 is generally cylindrical. The nozzle body 82 includes a converging portion 98 disposed adjacent the mounting end 84 and a distal cylindrical portion 99 adjacent the distal tip 85. The distal cylindrical portion 99 has a smaller diameter than that of the mounting end 84.

The nozzle body 82 defines a plurality of orifices 101, 102, 103, 104 in the distal tip 85. The orifices 101, 102, 103, 104 are in communication with the interior chamber 95 of the nozzle body 82 and with the main combustion chamber 30 when the prechamber assembly 25 is installed in the cylinder head 24. The nozzle body 82 includes an orifice bridge 108 defined circumferentially between the orifices 101, 102, 103, 104. The illustrated orifices 101, 102, 103, 104 are substantially identical to each other. Accordingly, it will be understood that the description of one orifice is applicable to the other orifices, as well.

For each orifice 101, 102, 103, 104, the nozzle body 82 includes an orifice surface 110 that defines the respective orifice 101, 102, 103, 104. The outer surface 88 defines an outer opening 112, and the inner surface 89 defines an inner opening 114. The orifice surface 110 defines an orifice passage 118 extending between, and in communication with, the outer opening 112 and the inner opening 114. The orifice passage 118 is in communication with the interior chamber 95 via the inner opening 114.

In embodiments, the nozzle body 82 can define any suitable number of orifices to achieve the desired swirl/mixing characteristics within the interior chamber 95 of the nozzle body 82 and the desired flame discharge pattern in the main combustion chamber 30 resulting from the combustion phase in the nozzle 50. For example, in the illustrated embodiment, the nozzle body 82 includes six orifices (four of which are shown in FIG. 1 with the other two being mirror images of the second and third orifices 102, 103, respectively). The six orifices are circumferentially arranged about the central longitudinal axis LA at substantially evenly-spaced angular positions (about sixty degrees apart from each other). The orifices 101, 102, 103, 104 are axially aligned along the central longitudinal axis LA.

In other embodiments, the nozzle body 82 can define a different number of orifices, such as eight or twelve orifices circumferentially arranged about the central longitudinal axis LA at substantially evenly-spaced angular positions (about forty-five degrees and about thirty apart from each other, respectively). In still other embodiments, the nozzle body 82 can define yet a different number of orifices. In yet other embodiments, the nozzle body 82 can define orifices that have variable spacing between at least two pairs of adjacent orifices and/or be axially offset from at least one other orifice.

The orifices 101, 102, 103, 104 are respectively symmetrically disposed about the central longitudinal axis LA such that the orifices 101, 102, 103, 104 extend along substantially the same angle of inclination relative to the central longitudinal axis LA. In embodiments, the orifices 101, 102, 103, 104 can extend along a different angle of inclination relative to the central longitudinal axis LA. In still other embodiments, at least one of the orifices 101, 102, 103, 104 can extend along an angle of inclination relative to the central longitudinal axis LA that is different from at least one other of the orifices 101, 102, 103, 104.

The orifices 101, 102, 103, 104 of the nozzle body 82 are configured to be in heat-transferring relationship with a source of fuel within the fuel combustion system 20. For example, the orifices 101, 102, 103, 104 can come into heat-transferring relationship with a flow of fuel mixture respectively passing through the orifices 101, 102, 103, 104 into the interior chamber 95 from the main combustion chamber 30. The orifices 101, 102, 103, 104 of the nozzle body can also come into heat-transferring relationship with a flow of a flame front respectively passing through orifices 101, 102, 103, 104 out of the interior chamber 95. As such, the temperature of the distal tip 85 can become elevated relative to other parts of the fuel combustion system 20 during operation of the fuel combustion system.

The orifices 101, 102, 103, 104 can be configured such that flows of burning fuel respectively conveyed from the interior chamber 95 out through the orifices 101, 102, 103, 104 are controllably directed away from the nozzle body 82 in diverging relationship to each other, controllably expanding the burning gases away from the distal tip 85 of the nozzle 50 into the main combustion chamber 30 in order to facilitate the ignition and burning of the combustible mixture in the main combustion chamber 30 over a larger volume at the same time.

Referring to FIGS. 1-4, the nozzle 50, which is constructed according to principles of the present disclosure, includes a knurled conduction surface 125 upon the outer surface 88 of the nozzle body 82. The knurled conduction surface 125 has a boundary surface 130 and a plurality of protrusions 135 (see FIGS. 3 and 4).

Figure 2:
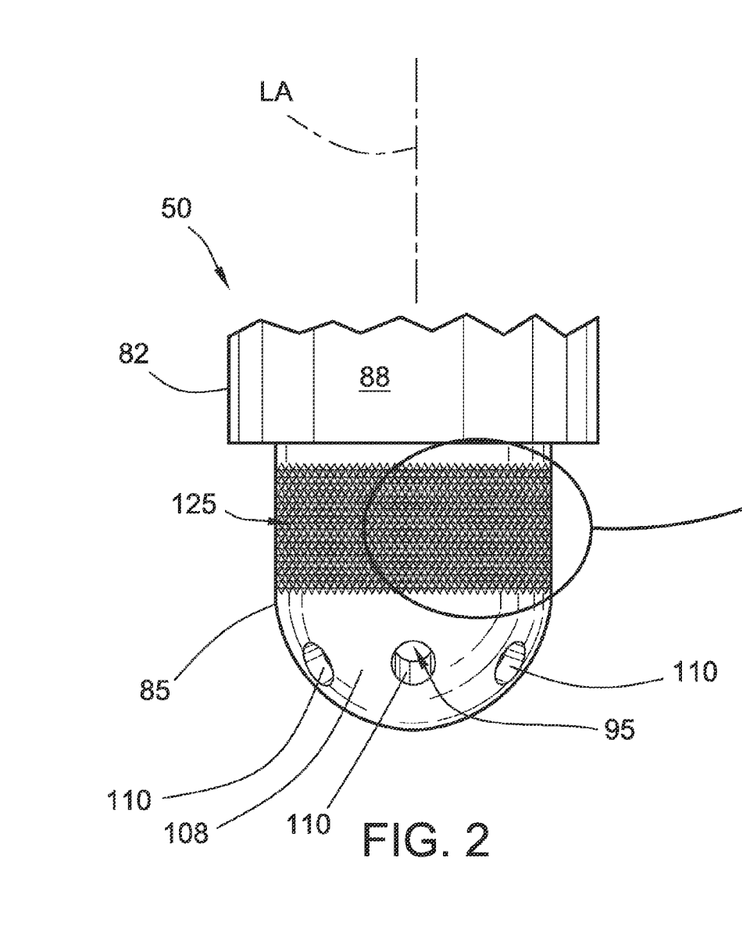
FIG. 2 is a fragmentary, elevational view of the prechamber nozzle of FIG. 1, illustrating a distal tip thereof.

Referring to FIG. 2, in the illustrated embodiment, the distal tip 85 includes the plurality of orifice surfaces 110 and the knurled conduction surface 125. The knurled conduction surface 125 extends around the distal tip 85 about the central longitudinal axis LA. In embodiments, at least a portion of the knurled conduction surface 125 is axially aligned with the interior chamber 95 along the central longitudinal axis LA. In the illustrated embodiment, the knurled conduction surface 125 is completely axially aligned with the interior chamber 95 of the nozzle body 82.

The illustrated knurled conduction surface 125 is generally cylindrical and circumscribes the distal tip 85 of the nozzle body 82. In embodiments, the size of the knurled conduction surface 125 is configured to substantially conform to the shape and size of the passage surface 79 in which the knurled conduction surface 125 is disposed when the nozzle 50 is installed in the fuel combustion system 20. The axially-aligned portion of the passage surface 79 is generally cylindrical, as well (see FIGS. 1 and 4).

Figure 3:
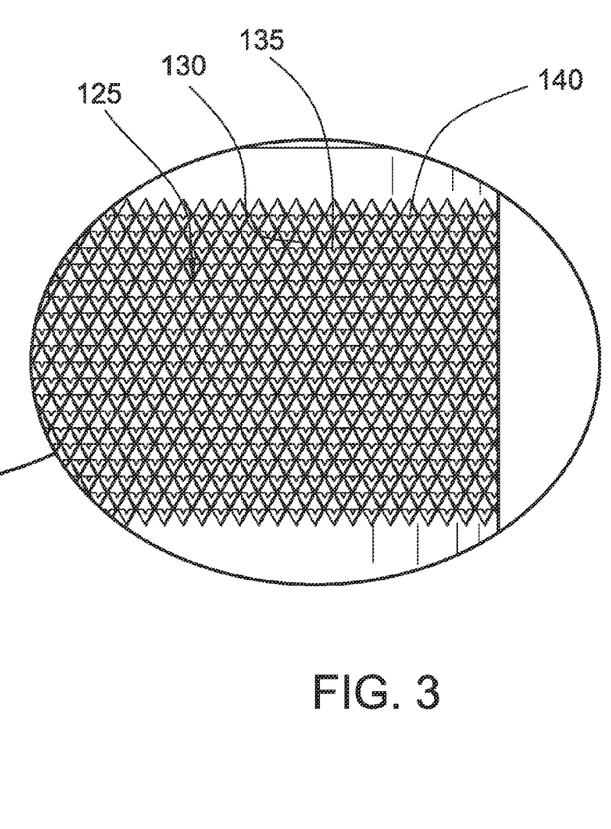
FIG. 3 is an enlarged, detail view of the prechamber nozzle of FIG. 2, as indicated by oval III in FIG. 2.
Figure 4:
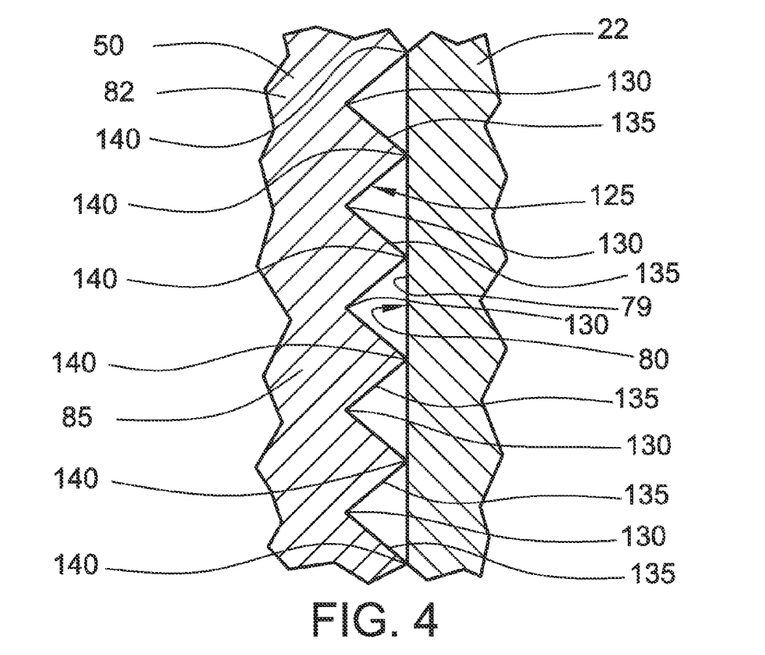
FIG. 4 is an enlarged, detail view of the prechamber nozzle of FIG. 1, as indicated by oval IV in FIG. 1.

Referring to FIGS. 3 and 4, the plurality of protrusions 135 projects outwardly from the boundary surface 130. The illustrated protrusions 135 are substantially the same and are diamond-shaped. In other embodiments, the protrusions 135 can have a different shape and/or size. For example, in embodiments, the protrusions 135 can have a truncated-pyramid shape, a cylindrical shape, or a helical shape, for example. In embodiments, at least one protrusion 135 can have a different shape than at least one other of the protrusions 135.

The illustrated protrusions 135 are arranged in a regular, crisscross pattern. In other embodiments, the protrusions 135 can be arranged in a different pattern, such as a helical pattern or aligned rows, for example. In other embodiments, the protrusions 135 can be arranged with a different spacing density.

In embodiments, the knurled conduction surface 125 can be made using any suitable technique. For example, in embodiments, a method of making a fuel combustion component 50 includes providing the outer surface 88 of the nozzle body 82 with the knurled conduction surface 125 by conventional machining processing, such as knurl rolling, for example. In other embodiments, the knurled conduction surface 125 can be made using additive manufacturing techniques (also referred to as, "additive layer manufacturing" or "3D printing")

In embodiments, the knurled conduction surface 125 is configured to facilitate the heat transfer between the nozzle body 82 and at least one of the cylinder head 24 and the cylinder block 22. In embodiments, at least a part of the knurled conduction surface 125 is aligned with the passage surface. In the illustrated embodiment, the knurled conduction surface 125 is substantially axially aligned with the passage surface 79 along the central longitudinal axis LA.

In embodiments, the knurled conduction surface 125 is configured such that at least a portion of the plurality of protrusions 135 are in contacting relationship with the passage surface 79 when the fuel combustion component 50 is in an operating temperature range such that a thermal conduction path is defined between the knurled conduction surface 125 and the passage surface 79, as shown in FIG. 4. This contacting relationship between the knurled conduction surface 125 and the passage surface 79 increases the conductive heat transfer between the fuel combustion component 50 and the cooler passage surface 79, thereby reducing the temperature of the fuel combustion component 50. In embodiments, the arrangement pattern of the knurled conduction surface 125 and the shape of the protrusions 135 can be configured to promote heat transfer through the contacting relationship between the knurled conduction surface 125 and the passage surface 79 of the cylinder block 22. In embodiments, the knurled conduction surface 125 can also help accommodate thermal expansion of the fuel combustion component 50 without imposing excessive stress upon the cylinder head/cylinder block that would lead to cracks or other structural impairments.

In embodiments, the knurled conduction surface 125 can be slightly smaller than the size of the component passage 80. The knurled conduction surface 125 can be configured and the sizes of the knurled conduction surface 125 and the component passage 80 accommodating the fuel combustion component 50 therethrough can be controlled such that the thermal expansion of the fuel combustion component 50 in the component passage 80 when subjected to operating conditions places the protrusions 135 of the knurled conduction surface 125 into contact with the passage surface 79, thereby establishing a contacting relationship therebetween without exceeding the allowable stress inside the component passage 80 to help avoid cracking the cylinder block 22 or the cylinder head 24.

In embodiments, the fuel combustion component 50 and the component 22 defining the component passage 80 within which the knurled conduction surface 125 is disposed can be made from different materials having different coefficients of thermal expansion. In embodiments, a suitable operating temperature range can be determined for the fuel combustion component 50 and the component 22 defining the component passage 80 within which the knurled conduction surface 125 is disposed over the range of intended use of the fuel combustion system 20. The dimensional sizes of the fuel combustion component 50 and the component 22 defining the component passage 80 within which the knurled conduction surface 125 is disposed can be configured based upon the extreme limits of the operating temperature range.

In embodiments, the knurled conduction surface 125 is configured such that it is in contacting relationship with the passage surface 79 irrespective of the operational state of the fuel combustion system 20. The protrusions 135 of the knurled conduction surface 125 can be placed in contacting relationship with the passage surface 79 via a compression fit.

Referring to FIGS. 1 and 4, the illustrated knurled conduction surface 125 is disposed within the component passage 80 such that the knurled conduction surface 125 is in conductive heat-transferring relationship with the cylinder block 22 substantially around the entire circumference of the component passage 80. In the illustrated embodiment, the knurled conduction surface 125 of the nozzle body 82 contactingly engages the cylinder block 22 to define a thermal conduction path therebetween when the fuel combustion system 20 is operational and the temperature of the nozzle body 82 becomes elevated relative to that of the cylinder block 22. The knurled conduction surface 125 can help reduce the temperature of the distal tip 85 of the nozzle body 82 by facilitating heat transfer along the thermal conduction path defined between the knurled conduction surface 125 of the nozzle body 82 and the cylinder block 22 with which the knurled conduction surface 125 is in contacting relationship.

Referring to FIG. 2, in the illustrated embodiment, the knurled conduction surface is disposed adjacent the orifices 101, 102, 103, 104. The knurled conduction surface can be configured to help reduce the temperature in the orifice bridge 108 of the nozzle body 82 when the fuel combustion system 20 is in operation. The component passage 80 and adjacent area of the cylinder block 22 are cooler than the orifice bridge 108 when in the intended operating environment for the fuel combustion component 50. The knurled conduction surface 125 is oriented over a thermal conduction path along a primary direction of heat flow to facilitate heat transfer away from the orifice bridge 108 which is subjected to high temperature when in use toward the cylinder block 22. The knurled conduction surface 125 is interposed between the orifice bridge 108 and the component passage 80 of the cylinder block 22 (in the illustrated example, the knurled conduction surface of the nozzle body 82 is in axial alignment with the component passage 80 when the nozzle 50 is installed).

Referring to FIG. 4, the plurality of protrusions 135 each includes a contact surface 140 in distal relationship to the boundary surface 130. The illustrated contact surfaces 140 each comprises a contact point constituting the peak of the diamond-shaped protrusion 135. In other embodiments, the contact surfaces 140 can have a different configuration. For example, in other embodiments, the contact surfaces 140 of the protrusions 135 can be substantially planar. In other embodiments, at least one contact surface 140 of one protrusion 135 can have a different shape than at least one other contact surface 140 of another protrusion 135 of the knurled conduction surface 125. In embodiments, the shape of the protrusions 135 can be configured to facilitate the compression of the protrusion 135 in response to interference fits between the fuel combustion component 50 and the passage surface 79 of the component 22 within which the fuel combustion component is disposed, including those interference fits created as a result of thermal expansion undergone when the fuel combustion system 20 is operating.

Referring to FIGS. 3 and 4, the knurled conduction surface 125 extends over a knurled surface area. The contact surfaces 140 of all of the plurality of protrusions 135 comprise an aggregated contact surface area. In embodiments, a ratio of the aggregated contact surface area to the knurled surface area can be adjusted to obtain the desired heat transfer characteristics from the knurled conduction surface 125 while maintaining the desired compressive yield characteristics from the material and/or shape of the protrusions 135 to reduce the incidence of stress cracks resulting from the interference fit between the knurled conduction surface 125 and the passage surface 79 within which the knurled conduction surface 125 is disposed, particularly when these parts experience thermal expansion during operation of the fuel combustion system 20. In embodiments, a ratio of the aggregated contact surface area to the knurled surface area is in a range between 0.05 and 0.5. In still other embodiments, the ratio of the aggregated contact surface area to the knurled surface area is between 0.2 and 0.5, between 0.25 and 0.5 in yet other embodiments, between 0.25 and 0.35 in other embodiments, and about 0.3 in a particular embodiment.

Figure 5:
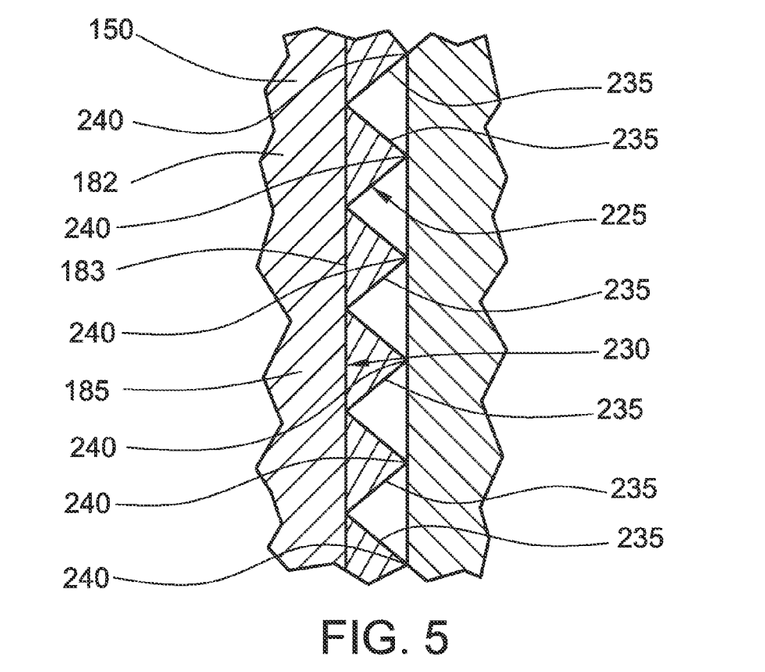
FIG. 5 is an enlarged, detail view as in FIG. 4 of another embodiment of a fuel combustion component in the form of a prechamber nozzle constructed in accordance with principles of the present disclosure.

Referring to FIG. 5, another embodiment of a fuel combustion component in the form of a nozzle 150 constructed in accordance with principles of the present disclosure is shown. The nozzle 150 is suitable for use in a fuel combustion system constructed in accordance with principles of the present disclosure, such as the fuel combustion system 20 of FIG. 1.

The nozzle 150 includes a nozzle body 182 having a knurled conduction surface 225. The knurled conduction surface 225 includes a boundary surface 230 and a plurality of protrusions 235 extending outwardly from the boundary surface 230. The knurled conduction surface 225 extends around the distal tip 185 of the nozzle 150. The plurality of protrusions 235 each includes a contact surface 240 in distal relationship to the boundary surface 230. In other, embodiments, the protrusions 235 and the contact surfaces 240 can have a different shape, size, and/or spacing density.

The nozzle body 182 includes a body wall portion 183 which in turn includes the boundary surface 230. The boundary surface 230 is generally cylindrical. The body wall portion 183, including the boundary surface 230, is made from a first material, and the plurality of protrusions 235 of the knurled conduction surface 225 is made from a second material. In embodiments, the second material is different from the first material.

In embodiments, the material from which the body wall portion 183 is made is stiffer than the material from which the protrusions 235 are made, and/or the material from which the protrusions 235 are made is more thermally conductive than the material from which the body wall portion 183 is made. In embodiments, the first material, from which the body wall portion 183 is made, has a first thermal conductivity value, and the second material, from which the protrusions 235 are made, has a second thermal conductivity value which is greater than the first thermal conductivity value. In embodiments, the first material, from which the body wall portion 183 is made, has a first elastic modulus value, and the second material, from which the protrusions 235 are made, has a second elastic modulus value. In embodiments, the first elastic modulus value is greater than the second elastic modulus value such that the body wall portion 183 is stiffer than the protrusions 235.

In embodiments, at least one of the protrusions 235 can be made from a material that is different from at least one other of the protrusions 235. In at least some of such embodiments, each material used to make the protrusions 235 can have a thermal conductivity value that is higher than the thermal conductivity value of the material used to make the body of the fuel combustion component—the body wall portion 183 in the embodiment illustrated in FIG. 5. In at least some of such embodiments, each material used to make the protrusions 235 can have an elastic modulus value that is less than the elastic modulus value of the material used to make the body of the fuel combustion component—the body wall portion 183 in the embodiment illustrated in FIG. 5.

In embodiments, the body of the fuel combustion component (such as, the body wall portion 183 of the nozzle 150) is manufactured from a suitable material, such as a metal alloy. In embodiments, the body is made from a nickel alloy. In embodiments, the body is made from at least one of a nickel alloy and a steel.

In embodiments, each protrusion 235 is made from a suitable material, such as a metal. In embodiments, each of the protrusions 235 is made from one or more of aluminum, copper, gold, silver, and an alloy thereof. In some embodiments, the protrusions 235 are made from oxygen-free copper. The nozzle 150 of FIG. 5 can be similar in other respects to the nozzle 50 of FIGS. 1-4.

It will be apparent to one skilled in the art that various aspects of the disclosed principles relating to fuel combustion systems and fuel combustion components can be used with a variety of engines. Accordingly, one skilled in the art will understand that, in other embodiments, an engine following principles of the present disclosure can include different fuel combustion components constructed according to principles of the present disclosure and can take on different forms.

Figure 6:
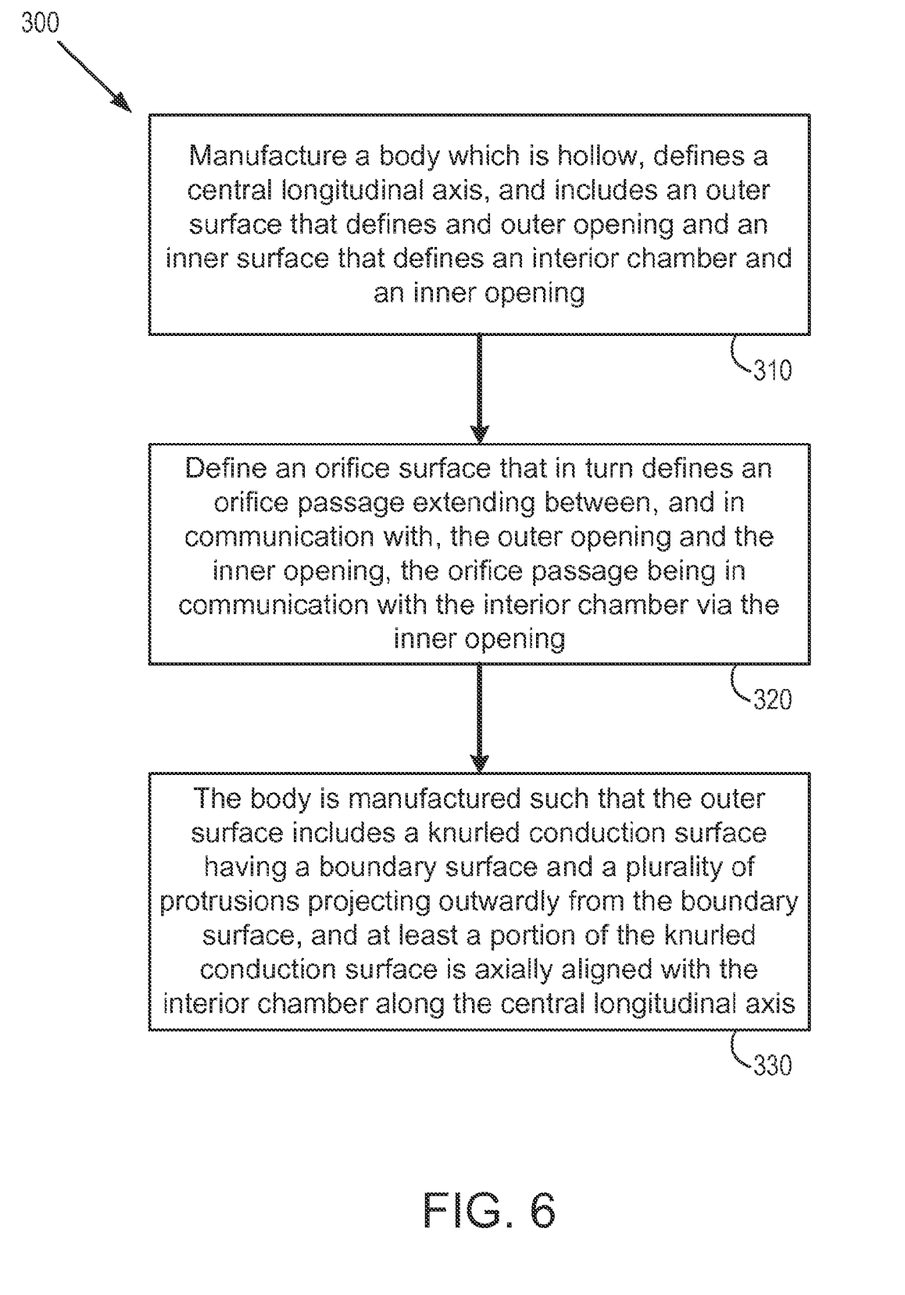
FIG. 6 is a flowchart illustrating steps of an embodiment of a method of making a component of a fuel combustion system of an engine following principles of the present disclosure.

Referring to FIG. 6, steps of an embodiment of a method 300 of making a fuel combustion component of a fuel combustion system of an engine following principles of the present disclosure are shown. The method of making includes manufacturing a body with a knurled conduction surface. In embodiments, a method of making a fuel combustion component of a fuel combustion system of an engine following principles of the present disclosure can be used to make any embodiment of a fuel combustion component according to principles of the present disclosure.

The illustrated method 300 of making a fuel combustion component includes manufacturing a body (step 310). The body is hollow and defines a central longitudinal axis. The body includes an outer surface and an inner surface. The outer surface defines an outer opening, and the inner surface defines an interior chamber and an inner opening.

An orifice surface is defined (step 320). The orifice surface defines an orifice passage extending between, and in communication with, the outer opening and the inner opening. The orifice passage is in communication with the interior chamber via the inner opening.

The body is manufactured such that the outer surface includes the knurled conduction surface (step 330). The knurled conduction surface has a boundary surface and a plurality of protrusions. The plurality of protrusions projects outwardly from the boundary surface. At least a portion of the knurled conduction surface is axially aligned with the interior chamber along the central longitudinal axis.

In embodiments of a method of making a fuel combustion component following principles of the present disclosure, the body comprises a nozzle body. In embodiments, the nozzle body can be any suitable nozzle body for use in a fuel combustion system. For example, the nozzle body can be suitable for use as a nozzle of a prechamber assembly in some embodiments or as a tip piece of a fuel injector in other embodiments.

In embodiments of a method of making a fuel combustion component following principles of the present disclosure, the body is manufactured such that the knurled conduction surface is defined via additive manufacturing (also sometimes referred to as "additive layer manufacturing" or "3D printing"). In embodiments, any suitable additive manufacturing equipment can be used. For example, in embodiments, a production 3D printer commercially available under the under the brand name ProX™ 200 from 3D Systems, Inc. of Rock Hill, S.C., can be used. In embodiments of a method of making a fuel combustion component following principles of the present disclosure, the body and each orifice surface are manufactured together via additive manufacturing, and each orifice passage is defined within the body substantially simultaneously with its manufacture.

In embodiments, the body is manufactured using additive manufacturing such that the body includes a body wall portion. The body wall portion includes the boundary surface and is made from a first material. The plurality of protrusions of the knurled conduction surface is made from a second material which is different from the first material.

In embodiments, the first material has a first thermal conductivity value, and the second material has a second thermal conductivity value which is greater than the first thermal conductivity value. In embodiments, the first material has a first elastic modulus value, and the second material has a second elastic modulus value. The first elastic modulus value is greater than the second elastic modulus value.

In embodiments, the body is manufactured from a suitable material, such as a metal alloy. In embodiments, the body is made from at least one of a nickel alloy and a steel. In embodiments, the body is made from a nickel alloy.

In embodiments, the protrusions of the knurled conduction surface are made from a suitable material, such as a metal having a higher thermal conductivity value and/or a lower elastic modulus value than that of the material from which the associated body is made. In embodiments, the protrusions of the knurled conduction surface are made from one or more of aluminum, copper, gold, silver, and an alloy thereof. In some embodiments, the protrusions of the knurled conduction surface are made from oxygen-free copper.

INDUSTRIAL APPLICABILITY

The industrial applicability of the embodiments of fuel combustion systems, fuel combustion components of a fuel combustion system of an engine, and methods of making a fuel combustion component for a fuel combustion system of an engine as described herein will be readily appreciated from the foregoing discussion. In embodiments, a nozzle constructed according to principles of the present disclosure can be used in a suitable component of a fuel combustion system of an engine, such as, a prechamber assembly or a fuel injector, for example. Embodiments of a fuel combustion component and/or a fuel combustion system according to principles of the present disclosure may find potential application in any suitable engine. Exemplary engines include those used in electrical generators and pumps, for example.

Embodiments of a fuel combustion component constructed according to principles of the present disclosure can include a body with a knurled conduction surface that helps facilitate the heat transfer between the body and at least one of the cylinder head and the cylinder block. The knurled conduction surface can help reduce the temperature of the body by facilitating heat transfer along a thermal conduction path defined between the knurled conduction surface of the body and at least one of the cylinder head and the cylinder block with which the knurled conduction surface is in contacting relationship. The configuration of the knurled conduction surface can also help accommodate thermal expansion of the fuel combustion component without imposing excessive stress upon the cylinder head/cylinder block that would lead to cracks or other structural impairments.

Embodiments of a fuel combustion component constructed according to principles of the present disclosure can be made using additive manufacturing techniques. The protrusions of the knurled conduction surface can be made using additive manufacturing techniques from a material having a higher thermal conductivity value than the material used to make the body upon which the knurled conduction surface is disposed. The knurled conduction surface can be oriented over a thermal conduction path along a primary direction of heat flow between a region of the fuel combustion component subjected to relatively high temperature, such as an orifice bridge of a nozzle, for example, and a region of the fuel combustion system which is relatively cooler when subjected to the intended operating environment of the fuel combustion system to facilitate heat transfer.

The knurled conduction surface can be configured and the sizes of the knurled conduction surface and component passage accommodating the fuel combustion component therethrough can be controlled such that thermal expansion of the knurled conduction surface in the component passage places the contact surfaces of the protrusions into contact with the component passage surface, establishing contact without exceeding the allowable stress inside the component passage. This contacting relationship between the knurled conduction surface and the component passage increases the conductive heat transfer between the fuel combustion component and the cooler cylinder head/block surfaces, thereby reducing the temperature of the fuel combustion component. The improved heat transfer characteristics can help reduce the amount of heat-induced damage suffered by the fuel combustion component during operation.

For example, in internal combustion engines, above a particular capacity, the energy of an ignition spark may no longer be sufficient to ignite reliably the combustion gas/air mixture, which for emissions reasons is often very lean, in the main combustion chamber. To increase the ignition energy, a prechamber assembly constructed according to principles of the present disclosure can be connected to the cylinder head/block and placed in communication with the main combustion chamber via a plurality of orifices defined in the nozzle. A small part of the mixture is enriched with a small quantity of combustion gas or an additional fuel and ignited in the precombustion chamber.

Flame propagation, i.e. ignition kernel, is transferred to the main combustion chamber by way of the orifices in the nozzle and the flame propagation ignites the lean fuel mixture. The discharge flame pattern emitting from the nozzle is advantageous because it has a hot surface area that can ignite even extremely lean or diluted combustible mixtures in a repeatable manner. In embodiments where the fuel combustion component comprises a nozzle body, the knurled conduction surface can be included on the distal tip and disposed adjacent the orifice bridge. The knurled conduction surface can help reduce the temperature in the orifices and the orifice bridges disposed between the orifices arrayed around the nozzle body.

In embodiments, the ignited mixture within the prechamber can be discharged through the orifices of the nozzle into the main combustion chamber with increased heat transfer effects through the body as a result of the knurled conduction surface included upon the nozzle body. The flame area produced by a prechamber assembly constructed according to principles of the present disclosure can help improve combustion of a lean fuel mixture in the main combustion chamber of the cylinder with which it is associated.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A fuel combustion component of a fuel combustion system of an engine, the fuel combustion component comprising:
   a body, the body being hollow and defining a central longitudinal axis, the body including an outer surface, an inner surface, and an orifice surface, the outer surface defining an outer opening, the inner surface defining an interior chamber and an inner opening, and the orifice surface defining an orifice passage extending between, and in communication with, the outer opening and the inner opening, the orifice passage being in communication with the interior chamber via the inner opening; and
   wherein the outer surface includes a knurled conduction surface, the knurled conduction surface having a boundary surface and a plurality of protrusions, the plurality of protrusions having a crisscross pattern and projecting outwardly from the boundary surface, and at least a part of the knurled conduction surface being axially aligned with the interior chamber along the central longitudinal axis.

2. The fuel combustion component according to claim 1, wherein the knurled conduction surface extends over a knurled surface area and the plurality of protrusions each includes a contact surface in distal relationship to the boundary surface, the contact surface of each of the plurality of protrusions comprising an aggregated contact surface area, and a ratio of the aggregated contact surface area to the knurled surface area being in a range between 0.05 and 0.5.

3. The fuel combustion component according to claim 2, wherein the ratio of the aggregated contact surface area to the knurled surface area is between 0.2 and 0.5.

4. The fuel combustion component according to claim 1, wherein the body includes a body wall portion, the body wall portion including the boundary surface, the body wall portion being made from a first material, and the plurality of protrusions of the knurled conduction surface being made from a second material, the second material being different from the first material.

5. The fuel combustion component according to claim 4, wherein the first material has a first thermal conductivity value, and the second material has a second thermal conductivity value, the second thermal conductivity value being greater than the first thermal conductivity value.

6. The fuel combustion component according to claim 4, wherein the first material has a first elastic modulus value, and the second material has a second elastic modulus value, the first elastic modulus value being greater than the second elastic modulus value.

7. The fuel combustion component according to claim 6, wherein the first material has a first thermal conductivity value, and the second material has a second thermal conductivity value, the second thermal conductivity value being greater than the first thermal conductivity value.

8. The fuel combustion component according to claim 1, wherein the body comprises a nozzle body, and the nozzle body includes a plurality of orifice surfaces defining a plurality of orifices.

9. The fuel combustion component according to claim 8, wherein the nozzle body includes a mounting end and a distal tip, the central longitudinal axis extending between the mounting end and the distal tip, and the distal tip including the plurality of orifice surfaces and the knurled conduction surface.

10. The fuel combustion component according to claim 9, wherein the knurled conduction surface extends around the distal tip about the central longitudinal axis.

11. A fuel combustion system comprising:
    a cylinder block, the cylinder block defining, at least partially, a main combustion chamber;
    a cylinder head, the cylinder head removably attached to the cylinder block, at least one of the cylinder block and the cylinder head including a passage surface defining a component passage;
    a fuel combustion component, the fuel combustion component extending through the component passage such that the fuel combustion component is in communication with the main combustion chamber, the fuel combustion component including:
       a body, the body being hollow, the body including an outer surface, an inner surface, and an orifice surface, the outer surface defining an outer opening, the inner surface defining an interior chamber and an inner opening, and the orifice surface defining an orifice passage extending between, and in communication with, the outer opening and the inner opening, the orifice passage being in communication with the interior chamber via the inner opening and the main combustion chamber via the outer opening, and
       wherein the outer surface includes a knurled conduction surface, the knurled conduction surface having a boundary surface and a plurality of protrusions, the plurality of protrusions having a crisscross pattern and projecting outwardly from the boundary surface, at least a part of the knurled conduction surface being aligned with the passage surface, and the knurled conduction surface configured such that at least a portion of the plurality of protrusions are in contacting relationship with the passage surface when the fuel combustion component is in an operating temperature range such that a thermal conduction path is defined between the knurled conduction surface and the passage surface.

12. The fuel combustion system according to claim 11, wherein the body includes a body wall portion, the body wall portion including the boundary surface, the body wall portion being made from a first material, and the plurality of protrusions of the knurled conduction surface being made from a second material, the second material being different from the first material.

13. The fuel combustion system according to claim 11, wherein the fuel combustion component comprises a nozzle, the fuel combustion system further comprising:
    a prechamber assembly in communication with the main combustion chamber, the prechamber assembly defining a precombustion chamber, the precombustion chamber in communication with the main combustion chamber, the prechamber assembly including a prechamber housing, an ignition device adapted to selectively ignite a fuel source disposed in the precombustion chamber, and the nozzle, the ignition device mounted to the prechamber housing, the nozzle and the prechamber housing cooperating together to define the precombustion chamber.

14. The fuel combustion system according to claim 11, wherein the passage surface is generally cylindrical, and the body includes a distal tip, the distal tip including the orifice surface and the knurled conduction surface, the knurled conduction surface being generally cylindrical and circumscribing the distal tip, the knurled conduction surface being substantially aligned with the passage surface.

15. The fuel combustion system according to claim 14, wherein, the knurled conduction surface extends over a knurled surface area and the plurality of protrusions each including a contact surface in distal relationship to the boundary surface, the contact surface of all of the plurality of protrusions comprising an aggregated contact surface area, and a ratio of the aggregated contact surface area to the knurled surface area being in a range between 0.05 and 0.5.

16. A method of making a fuel combustion component for a fuel combustion system of an engine, the method of making comprising:
    manufacturing a body, the body being hollow and defining a central longitudinal axis, the body including an outer surface and an inner surface, the outer surface defining an outer opening, the inner surface defining an interior chamber and an inner opening;
    defining an orifice surface, the orifice surface defining an orifice passage extending between, and in communication with, the outer opening and the inner opening, the orifice passage being in communication with the interior chamber via the inner opening;
    wherein the body is manufactured such that the outer surface includes a knurled conduction surface, the knurled conduction surface having a boundary surface and a plurality of protrusions, the plurality of protrusions having a crisscross pattern and projecting outwardly from the boundary surface, and at least a part of the knurled conduction surface being axially aligned with the interior chamber along the central longitudinal axis.

17. The method of making according to claim 16, wherein the body is manufactured such that the knurled conduction surface is defined via additive manufacturing.

18. The method of making according to claim 17, wherein the body is manufactured using additive manufacturing such that the body includes a body wall portion, the body wall portion including the boundary surface, the body wall portion being made from a first material, and the plurality of protrusions of the knurled conduction surface being made from a second material, the second material being different from the first material.

19. The method of making according to claim 18, wherein the first material has a first thermal conductivity value, and the second material has a second thermal conductivity value, the second thermal conductivity value being greater than the first thermal conductivity value.

20. The method of making according to claim 18, wherein the first material has a first elastic modulus value, and the second material has a second elastic modulus value, the first elastic modulus value being greater than the second elastic modulus value.

* * * * *